United States Patent [19]

Kaebitzsch, deceased et al.

[11] 4,307,658

[45] Dec. 29, 1981

[54] APPARATUS FOR RELEASABLY RETAINING COOKING GRIDDLES IN A COOKING APPLIANCE

[75] Inventors: Johannes W. Kaebitzsch, deceased, late of Algonquin, Ill.; by Ludwina Kaebitzsch, executrix, Crystal Lake, Ill.

[73] Assignee: International Foodservice Equipment Systems, Inc., New York, N.Y.

[21] Appl. No.: 157,220

[22] Filed: Jun. 9, 1980

[51] Int. Cl.³ .............................................. A47J 37/06
[52] U.S. Cl. ...................................... 99/376; 403/322
[58] Field of Search ................. 99/372, 374, 376, 377, 99/380; 292/16, 74; 403/322

[56] References Cited

U.S. PATENT DOCUMENTS

| | | | |
|---|---|---|---|
| 2,102,879 | 12/1937 | Benson | 99/376 |
| 2,521,391 | 9/1950 | Meents | 403/322 |
| 2,795,182 | 6/1957 | Gomersall | 99/376 |
| 2,903,959 | 9/1959 | Wagner | 99/376 |

Primary Examiner—Billy J. Wilhite

[57] ABSTRACT

Apparatus for releasably retaining a cooking griddle in a cooking appliance comprises a post having a base portion formed integrally with the griddle and against which an annular member positioned on the post is spring biased. Apparatus comprising spaced apart cam members is slidable radially with respect to the post to wedge between the annular member and a plate member positioned behind the cooking griddle, the cam being selectively manipulated to engage or disengage the annular member to releasably retain the cooking griddle in the appliance.

10 Claims, 6 Drawing Figures

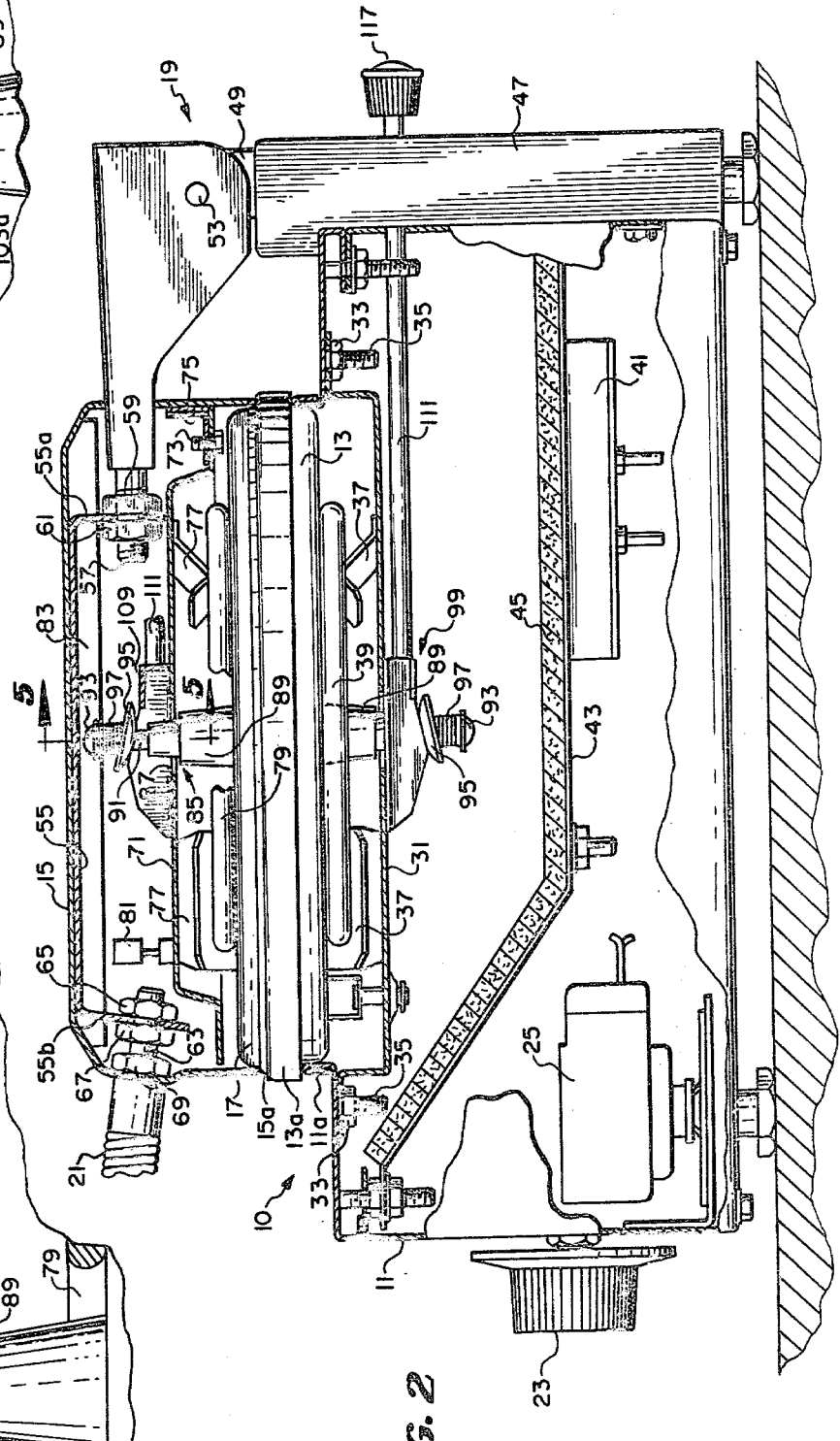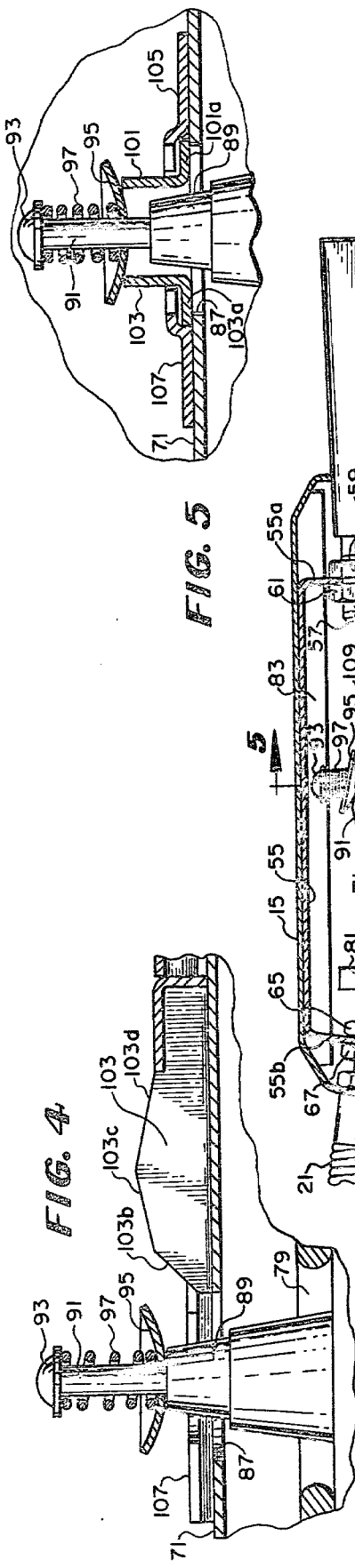

APPARATUS FOR RELEASABLY RETAINING COOKING GRIDDLES IN A COOKING APPLIANCE

BACKGROUND OF THE INVENTION

The present invention relates generally to cooking appliances and, more particularly, to apparatus for releasably retaining cooking griddles such as waffle grids in cooking appliances.

Many cooking appliances, such as waffle bakers, sandwich grills and the like, typically provide heated griddles or grids for cooking foods such as waffles, grilled sandwiches, hamburgers and other foods. In commercial operations, these appliances require frequent cleaning of the cooking surfaces to ensure that crumbs and other cooking residues do not accumulate on the cooking surfaces and thereby detract from the appearance and quality of food subsequently cooked with the appliance. This is especially a problem in waffle bakers where the griddles take the form of waffle grids having surface depressions in which baked-on residues tend to accumulate.

Previously, however, waffle grids have been retained in waffle bakers by screws, metal clips or similar means, making removal of the grids from the waffle baker difficult and discouraging regular cleaning of the grids. Moreover, screws may become frozen and clips may fracture due to the heat stress associated with the high temperatures at which such appliances are operated. The natural tendency, therefore, is to attempt to clean the grids without removing them from the appliance, but this practice can prove to be hazardous if water or cleaning solution spills from the waffle grid and leaks into the appliance causing an electrical short circuit. Also, if the waffle grids are of the type having a non-stick coating on the cooking surface, it may be necessary to replace the grids after extended usage, and replacement may be postponed due to the aforementioned difficulties. In certain instances, it may also be desirable to replace the waffle grids with flat griddles suitable for toasting sandwiches or the like.

One attempt to provide an alternative means for releasably securing griddles such as waffle grids in a cooking appliance has been shown in U.S. Pat. No. 2,102,879, issued to B. A. Benson, wherein a latch arm pivotably engaging one side of the appliance casing and extending transversely below the grid is swung horizontally across the bottom of the grid to slidably engage a sheet metal hook welded to the bottom of the grid. In an alternative embodiment shown therein, the hook is cast with the grid. Spot welds such as that utilized in the first embodiment, however, suffer from the disadvantage of being subject to fracture from heat stress, and the particular configuration shown in the second embodiment complicates the casting of the waffle grid.

Accordingly, there still remains a need to provide a quick-release griddle retaining apparatus for cooking appliances such as waffle bakers or the like.

SUMMARY OF THE INVENTION

In accordance with the present invention, the cooking appliance hereinafter disclosed obviates the aforementioned disadvantages of prior cooking appliances and provides a cooking appliance having improved apparatus for releasably retaining cooking griddles in the appliance.

The releasable griddle retaining apparatus of the present invention comprises post means depending axially from the griddle and means comprising an annular member positioned on the post means to slide thereon. The annular member is biased toward the griddle by biasing means which, for example, comprises a coiled spring carried on the post means and secured to the post means in biasing contact with the annular member. Means are also provided for positioning the griddle in the cooking appliance, and a camming means, slidably mounted in relation to the griddle positioning means, is moveable radially with respect to the post means to engage the annular member, move the annular member against the bias of the biasing means, and wedge against the annular member to releasably retain the griddle in the griddle positioning means. More particularly, the griddle positioning means includes a plate member spaced behind the griddle and having an aperture through which the post means extends. The post means includes a base portion extending from the griddle for seating the annular member against the bias of the biasing means at a predetermined distance from the plate member. Means are also provided for selectively advancing and retracting the camming means which includes a pair of spaced part cam members adapted to slide on the plate member on opposite sides of the post means to engage or disengage the annular member. Each of the spaced apart cam members includes at least one forwardly inclined camming surface upon which the annular member slides against the bias of the biasing means as the camming means initially engages the annular member and a rearwardly inclined camming surface for retaining the camming means in engagement with the annular member to retain the griddle in the griddle positioning means of the appliance when the camming means is fully advanced and wedged between the annular member and the plate member. Conversely, the annular member slides up the rearwardly inclined camming surface and down the forwardly inclined camming surface to release the griddle as the camming means is retracted.

In a particular embodiment hereinafter shown and described, the releasable griddle retaining apparatus of the present invention is shown embodied in an electric waffle baker having a case and a dome hinged to the case to be moveable to close onto the case. The case provides waffle cooking grid means having an upwardly facing cooking surface and the dome provides waffle cooking grid means having an upwardly facing non-cooking surface as well as a downwardly facing waffle cooking surface for engaging the upwardly facing cooking surface of the case grid means when the dome is closed onto the case. The plate member comprising the griddle positioning means is spaced behind the non-cooking surface of the dome grid means and secured to the dome. The means for advancing and retracting the camming means extends from the dome means and is selectively manipulated to engage or disengage the camming means and the annular member, the camming means sliding in guide means on the plate member and wedging between the plate member and the annular member to releasably retain the dome grid means in the dome. Similar apparatus may be provided to also releasably retain the case grid means in the case, thereby permitting simplified removal of the dome grid means and the case grid means from the appliance.

Accordingly, the aforementioned features of the present invention combine to provide a cooking appliance having improved apparatus for releasably retaining cooking griddles such as waffle grids in a cooking appliance.

BRIEF DESCRIPTION OF THE DRAWINGS

The features of this invention which are believed to be novel are set forth with particularity in the appended claims. The invention, together with its further objects and the advantages thereof, may be best understood, however, by reference to the following description taken in conjunction with the accompanying drawings in which like reference numerals identify like elements in the several figures and in which:

FIG. 2 in a sectional view taken along line 2—2 in FIG. 1 showing the apparatus for releasably retaining the dome grid in the dome assembly and the case grid in the case assembly;

FIG. 4 is a fragmentary enlarged sectional view of the releasable grid retaining apparatus shown in FIG. 2 wherein the camming apparatus has been retracted to permit removal of the dome grid from the dome assembly;

FIG. 5 is a fragmentary enlarged sectional view taken along line 5—5 in FIG. 2 showing the camming apparatus means advanced to engage the annular member and retain the dome grid in the dome assembly.

DETAILED DESCRIPTION

Figure 1:
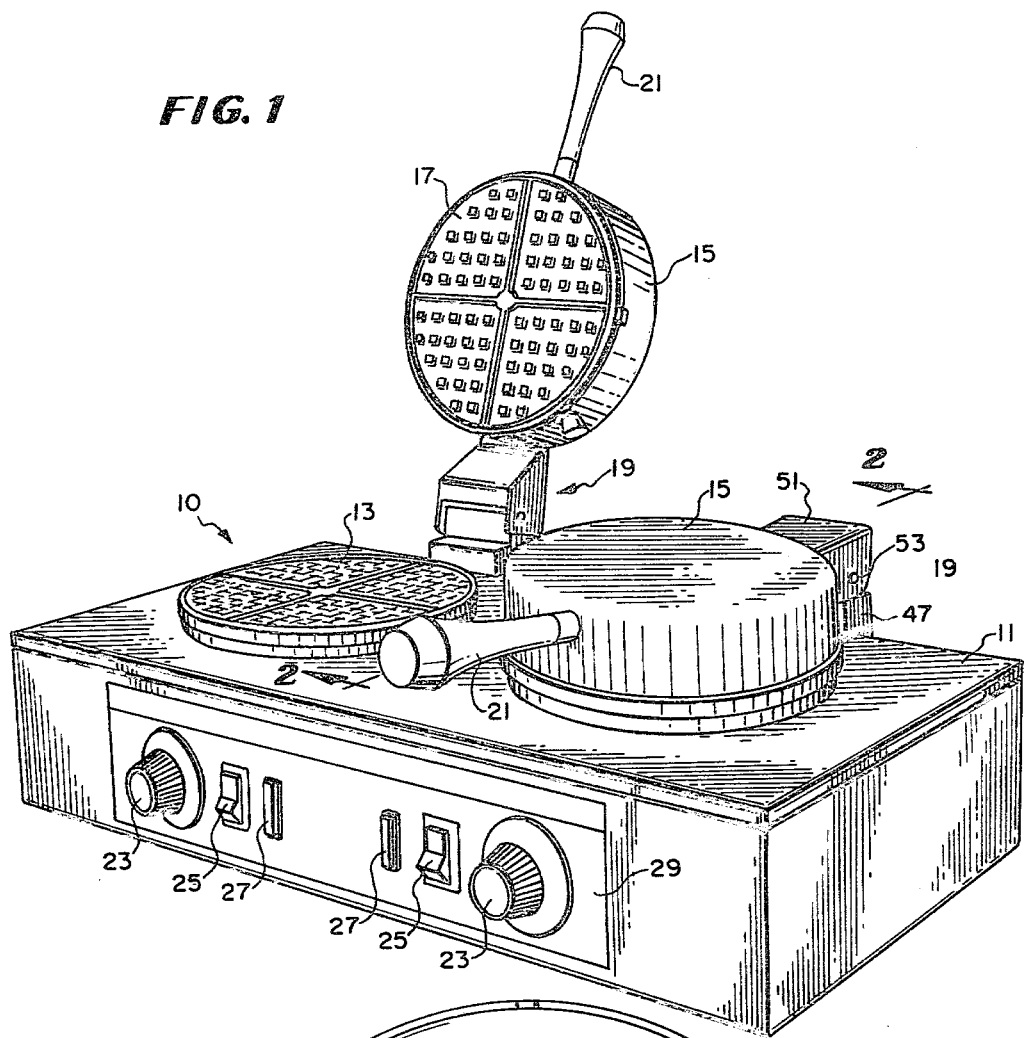
FIG. 1 is a perspective view of an electric waffle baker having a pair of dome assemblies hinged to a case assembly and providing heated dome grids for engaging heated cases grids used in cooking waffles.
Figure 3:
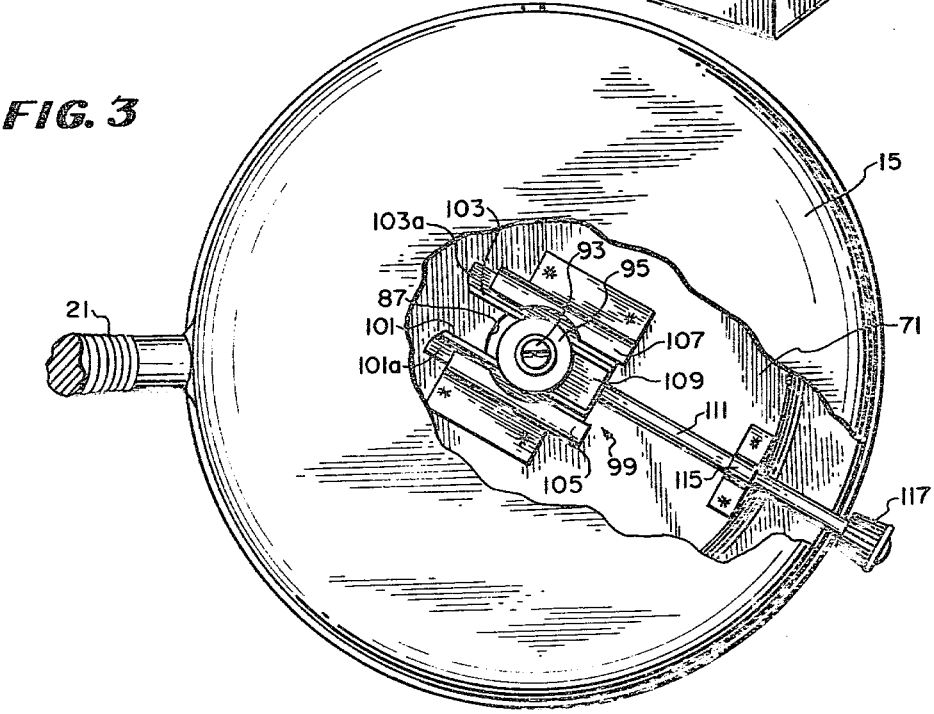
FIG. 3 is a top plan view of one of the dome assemblies shown in FIG. 1 with the top wall of the dome assembly broken away to show the releasable grid retaining apparatus.
Figure 6:
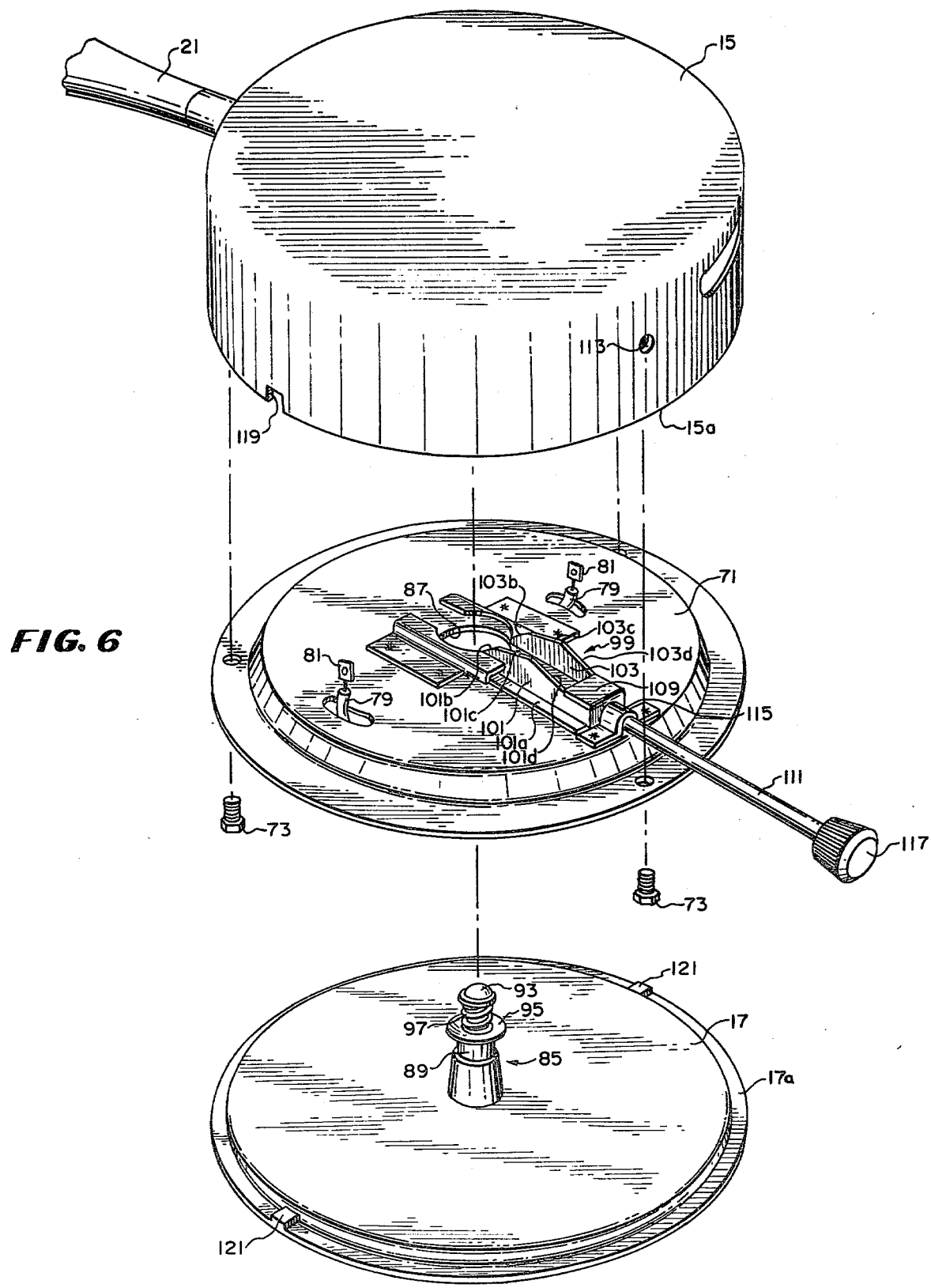
FIG. 6 is an exploded perspective view of one of the dome assemblies further illustrating the releasable grid retaining apparatus of the present invention.

With reference now to the drawings, the particular cooking appliance shown therein and identified generally by reference numeral 10 is an electric waffle baker comprising a stationary, case assembly 11 having a pair of upwardly facing waffle cooking grids 13 and further comprising a corresponding pair of movable dome assemblies 15 having respective waffle cooking grids 17. Each dome assembly 15 is mounted to the case by a hinge mechanism 19, and a handle 21 extends forwardly from each dome assembly to permit an operator to move the dome assembly between a raised, non-cooking position and a lowered, cooking position where the waffle cooking grid 17 of the dome assembly overlies and engages the corresponding waffle grid 13 of the case assembly 11. Each pair of grids 13 and 17 defines a separate waffle cooking section which is adjustable over a relatively broad cooking temperature range by means of a corresponding temperature control knob 23 and which is maintained at the selected temperature by a thermostat 25 (FIG. 2). The control knob 23 for each waffle cooking section, together with a corresponding on-off switch 25 and an associated on-off indicator light 27, is positioned, for example, on a control panel 29 on the front wall of the lower case assembly 11.

Further details of the construction of the subject waffle baker and the releasable grid retaining apparatus of the present invention are revealed in FIG. 2 where it can be seen that the case grid 13 further includes a circumferential flange 13a which resides on an upturned flange 11a of the top case wall and which extends upwardly to receives the dome grid 17 in mating arrangement when the dome assembly is lowered onto the case assembly. In the particular embodiment shown in the drawings, the case grid 13 is generally circular and the flange 11a defines a correspondingly dimensioned opening in the top case wall. A circular pan member 31 is positioned below the case cooking grid 13 and held in position by a nuts 33 which threadably engage studs 35 secured, such as by spot welding, to the underside of the top case wall at selected intervals around the periphery of the top wall opening. Spring clip members 37 secured to the upper surface of the bottom pan 31 resiliently retain an electric heating coil element 39 against or closely adjacent to the bottom, noncooking surface of the case cooking grid 13. The electrical heating coil 39 is coupled to an AC electrical source (not shown) through an electrical terminal block 41 which supplies electrical current to the heating coil 39 to heat the grid 13 and, in particular, the top cooking surface of the grid to the desired temperature. The thermostat 25, adjustable by means of control knob 23, is also coupled to the terminal block 41 to permit the operator to adjust the temperature of the cooking grid 13 to desired cooking temperature. Because the electrical connections between the heating coil 39 and the terminal block 41, between the terminal block 41 and the AC electrical source and between the thermostat 25 and the terminal block 41 are standard, however, these connections have not been shown in the drawings in the interest of greater clarity. A baffle plate 43 is secured inside the case assembly 11 to support a layer of insulation 45 below the bottom pan 31 and thereby retain heat generated by the heating coil 39 to protect the thermostat 25 and other components located in the case assembly from damage due to the heat generated by the heating coil.

A pair of channel members 47, each associated with a corresponding one of the cooking sections, are secured to the back wall of the case assembly 11 and extend upwardly beyond the top case wall. Each channel member 47 has a stud 49 at the top end thereof to which a hinge arm 51 is pivotably coupled by a hinge pin 53 to form the hinge mechanism 19. In turn, the corresponding dome assembly 15 is mounted to the distal end of the corresponding hinge arm 51, and to this end, a bracket 55 is secured, for example, by spot welding to the top inside wall of the dome assembly. The bracket 55 provides a downwardy extending rear flange portion 55a having an aperture for receiving a threaded bolt 57 secured to the distal end of the hinge arm 51, and the dome assembly is secured thereto by nuts 59 and 61. The other end of bracket 55 also provides a downwardly extending front flange portion 55b having an aperture aligned with an aperture through the front wall of the dome 15. A threaded rod 63 extends through the aligned apertures and is secured to the flange 55b and the dome 15 by nuts 65, 67 and 69, to extend from the dome 15 and mount the handle 21 thereon.

The bottom end of the dome assembly 15 is open to provide a circumferential rim 15a against which a corresponding circumferential flange 17a of the dome cooking grid resides when the dome cooking grid 17 is installed in the dome assembly. The dome cooking grid 17 is preferably identical to the case grid 13 and provides a downwardly facing cooking surface having a plurality of downwardly extending projections arranged in a grid-like pattern to impart the well-known waffle pattern to the waffle cooked therein. A circular top pan 71 overlies the dome cooking grid 17 and is secured by screws 73 to angle flanges 75 spot welded to the interior side walls of the dome. As in the lower case grid section, spring clips 77 are secured to the bottom side of the top pan 71 to hold an electrical heating coil element 79 therein and resiliently press it against or near the top, non-cooking surface of the dome cooking grid 17. Lugs 81 coupled to the heating coil 79 extend upwardly through the top pan 71 and are connected to the terminal block 41 by electrical conductors (not shown) routed to the case assembly 11 via the hinge arm 51 and the channel members 47. Insulation in the form of a pad 83 is provided on the underside of the top dome wall to minimize heat transfer to the top of the dome and prevent potential injury to the user.

In accordance with the present invention, apparatus is provided for releasably retaining the dome grid and the case grid in the dome assembly and the case assembly, respectively. Because the case cooking grid retaining apparatus is identical to the apparatus for retaining the dome cooking grid in the dome assembly, further description of the case grid retaining apparatus will not be repeated. Instead, it will be understood that like reference numerals are applied to like elements comprising the dome cooking grid retaining apparatus and the case cooking grid retaining apparatus and that their respective operations are identical. It will be further understood that for the purpose of clarity in the drawings the apparatus for releasably retaining the dome cooking grid in the dome assembly, as it is illustrated in FIG. 2, has been shown rotated with respect to its actual position as shown in FIG. 1.

The releasable grid retaining apparatus shown in the drawings comprises a post assembly, identified generally by reference numeral 85, which extends axially from the non-cooking surface of the dome grid 17 and upwardly through a central aperture 87 in the top pan 71. More particularly, the post assembly 85 comprises a base portion 89 formed integrally, such as by casting, with the dome grid 17 and having a threaded hole for receiving the correspondingly threaded end of a post member 91 therein. A slotted head 93 at the end of the post 91 facilitates the assembly of the post to the base portion 89. An annular member 95, for example, a dish-shaped washer, slides on the post 91 and is biased to reside against the distal end of the base portion 89 by a coiled spring 97 carried on the post 91. The outer end of the coil is restrained by the slotted head 93 of the post and, accordingly, the spring 97 is captured between the distal end of the base portion and the slotted head. A camming apparatus, identified generally by reference numeral 99, is slidably mounted on the top pan 71 to move radially with respect to the post assembly 85 such that a pair of spaced apart cam members 101 and 103 slide on opposite sides of the post 91. Each of the spaced apart cam members 101 and 103 includes a base flange, 101a and 103a, respectively, upon which the member slides, and the base flanges 101a and 103a, in turn, the captured by and slide within corresponding guides 105 and 107 secured to the top pan 71 on opposite sides of the aperture 87. Each of the guides, 105 and 107, comprises a base portion which is spot welded to the top surface of the top pan 71, and a horizontal flange which overlies the base flange of the corresponding cam member to permit the camming apparatus 85 to slide on the pan while preventing it from falling away from the top pan when the dome assembly 15 is raised to the non-cooking position. The edges of the horizontal flanges are notched and aligned with the aperture 87 to permit the annular member 95 to pass therethrough when the grid 17 is installed in or removed from the dome assembly. The spaced apart cam members 101 and 103 are joined by a web 109 and can be manipulated toward or away from the post assembly 85 by a rod 111 attached to the web 109 and extending through an opening 113 in the dome. A bracket 115 is secured to the top pan 71 and aligned with the guides 105 and 107 such that the rod 111 is free to move in the radial direction, the bracket 115 also serving as a stop to prevent the base flanges 101a and 103a of the cam members from disengaging the guides. A knob 117 is threaded onto the outer end of the rod 111. and by manipulation thereof, an operator can selectively advance or retract the camming apparatus 99.

As illustrated in the drawings, and particularly in FIG. 4, the top edge of each cam member 101 and 103 provides an edge portion, 101b and 103b, respectively, which is forwardly inclined at a relatively steep angle, an adjacent edge portion, 101c and 103c, respectively, which is also forwardly inclined, but at a lesser angle with respect to horizontal than the adjacent edge portions, 101b and 103b, and a rearwardly inclined edge portion, 101d and 103d, respectively, which slopes downwardly. In FIG. 4, it can be seen that the annular member 95 is biased against the distal end of the post base portion 89 when the camming apparatus 99 is retracted, However, as the camming apparatus 99 is advanced toward the post assembly 85 by manipulation of the rod 111, the annular member 95 initially engages the first, forwardly inclined camming surfaces 101b and 103b and thereafter slides onto the second forwardly inclined camming edge surfaces 101c and 103c. Full advancement of the camming apparatus 99 then causes the annular member 95 to crest over the edges 101c and 103c and slide downwardly on the rearwardly inclined camming edge surfaces 101d and 103d to retain the spaced apart cam members 101 and 103 of the camming apparatus in the fully advanced position. Friction between the annular member 95 and the camming surfaces of the spaced apart cam members 101 and 103 can be reduced to facilitate the easy, but effective, operation of the camming apparatus by utilizing an annular member comprising the dish-shaped washer shown in the drawings. Accordingly, when the camming apparatus 99 is fully advanced, as illustrated in FIGS. 2 and 5, it can be seen the annular member 95 is lifted from distal end of the post base portion 89 by the spaced apart cam members 101 and 103, and the dome grid 17 is releasably retained within the dome assembly 15 by the wedging action of the camming apparatus 99 between the top pan 71 and the spring-biased annular member 95. Similarly, when the camming apparatus is retracted, the annular member 95 slides up the rearwardly inclined camming surfaces and down the forwardly inclined camming surfaces to release the annular member and allow the dome grid 17 to be removed from the dome assembly. Thus, simple manipulation of the rod 111 to advance or retract the camming apparatus 99 to or from engagement with the annular member 95 permits the selective retention or release of the dome cooking grid 17.

Finally, one or more slots 119 are provided along the bottom edge of the dome 15 to receive therein tabs 121 formed on the circumferential flange 17a of the dome grid during the casting of the grid. The tabs cooperate with the slots to orient the dome grid in the dome assembly and align the dome grid with the case grid which oriented in the same manner in the case assembly.

Accordingly, the improved grid retaining apparatus of the present invention provides means whereby the cooking grids of an electric waffle baker or a similar appliance can be quickly and simply removed from the appliance to facilitate cleaning of the grids. Further, the subject releasable grid retaining apparatus makes it relatively easy to replace the waffle grids and substitute flat griddles or the like for converting the appliance to a sandwich grill or for a similar use.

While a particular embodiment of the present invention has been shown and described, it will be obvious to those skilled in the art that various changes and modifications may be made without departing from the invention in its broader aspects. Accordingly, the aim in the appended claims is to cover all such changes and modifications which may fall within the true spirit and scope of the invention.

What is claimed is:

1. In a cooking appliance having griddle means and means for heating said griddle means, the improvement comprising:
   post means depending axially from said griddle means;
   means comprising an annular member positioned on said post means to slide thereon;
   means for biasing said annular member toward said griddle means;
   means for positioning said griddle means in said cooking appliance; and
   means slidably mounted in relation to said griddle positioning means and movable radially with respect to said post means to engage said annular member and move said annular member against the bias of said biasing means, said means for engaging said annular member wedging against said annular member to releasably retain said griddle means in said griddle positioning means.

2. The improvement in accordance with claim 1 wherein said griddle positioning means includes a plate member spaced behind said griddle means and having an aperture through which said post means extends, wherein said post means includes a base portion extending from said griddle means and through said aperture, said base portion seating said annular member against the bias of said biasing means at a predetermined distance from said plate member, and wherein said means for engaging said annular member is slidable on said plate member across said aperture to engage said annular member and wedge between said annular member and said plate member.

3. The improvement in accordance with claim 1 or 2 wherein said means for engaging said annular member comprises camming means having a pair of spaced apart cam members adapted to slide on opposite sides of said post means and means for selectively advancing and retracting said camming means to cause said spaced apart cam members to engage or disengage said annular member.

4. The improvement in accordance with claim 3 wherein each of said spaced apart cam members includes a forwardly inclined camming surface upon which said annular member slides against the bias of said biasing means as said camming means initially engages said annular member and a rearwardly inclined camming surface for retaining said camming means in engagement with said annular member, said annular member sliding up said rearwardly inclined camming surfaces and down said forwardly inclined camming surfaces as said camming means is retracted to release said griddle means.

5. The improvement in accordance with claim 3 wherein said means for selectively advancing and retracting said camming means comprises a rod-like member having a first end coupled to said camming means and a distal end extending from said appliance for permitting manipulation of said rod-like member to selectively engage and disengage said camming means and said annular member.

6. The improvement in accordance with claim 3 wherein each of said spaced apart cam members includes a base flange, and including means in which said flanges slide for guiding said camming means during advancement and retraction of said camming means.

7. The improvement in accordance with claim 1 or 2 wherein said biasing means comprises a coiled spring carried on said post means and including means secured to said post means for retaining said coiled spring on said post means and in biasing contact with said annular member.

8. In an electric waffle baker comprising a case having grid means providing an upwardly facing cooking surface and a downwardly facing non-cooking surface, a dome hinged to said case and movable to close onto said case, said dome having grid means providing an upwardly facing non-cooking surface and a downwardly facing cooking surface for engaging the upwardly facing cooking surface of said case grid means when said dome is closed onto said case, and means for heating said case grid means and said dome grid means, the improvement comprising;
   post means depending axially from the non-cooking surface of said dome grid means;
   an annular member positioned on said post means to slide thereon,
   said post means having a base portion extending from said dome grid means for seating said annular member;
   a coiled spring carried on said post means and secured thereto for biasing said annular member toward said dome grid means to resiliently seat said annular member against said base portion;
   means including a plate member spaced behind the non-cooking surface of said dome grid means and secured to said dome for positioning said dome grid means in said dome, said plate member having a aperture through which said post means base portion extends;
   means comprising a pair of spaced apart cam members, each of said cam members having a forwardly inclined camming surface, a rearwardly inclined camming surface, and a base flange;
   means secured to said plate member for engaging said base flanges and guiding said camming means to slide radially with respect to said post means, said cam members sliding on opposite sides of said post means; and
   means coupled to said camming means and extending from said dome for selectively manipulating said camming means to engage or disengage said annular member,
   said annular member initially sliding outwardly on said post means against the bias of said coiled spring on said forwardly inclined camming surfaces and then being retained on said rearwardly inclined camming surfaces as said camming means is manipulated to engage said annular member, and said annular member sliding up said rearwardly inclined camming surfaces and down said forwardly inclined camming surfaces to release said annular member and permit removal of said dome grid means from said dome as said camming means is manipulated to disengage said annular member.

9. The improvement in accordance with claim 8 including post means depending axially from the non-cooking surface of said case grid means, a second annular member positioned on said case grid post means to slide thereon, said case grid post means having a base portion extending from said case grid means for seating said second annular member, a second coiled spring carried on said case grid post means and secured thereto for biasing said second annular member toward said case grid means to resiliently seat said second annular member against said case grid post base portion, means including a second plate member spaced behind the non-cooking surface of said case grid means and secured to said case for positioning said case grid means in said case, said second plate member having an aperture through which said case grid post base portion extends, second camming means comprising a pair of spaced apart cam members, each of said cam members having a forwardly inclined camming surface, a rearwardly inclined camming surface, and a base flange, means secured to said second plate member for engaging said base flanges and guiding said second camming means to slide radially with respect to said case grid post means, said cam members sliding on opposite sides of said case grid post means, and means coupled to said second camming means and extending from said case for selectively manipulating said second camming means to engage or disengage said second annular member, said second annular member initially sliding outwardly on said case grid post means against the bias of said second coiled spring on said forwardly inclined camming surfaces and then being retained on said rearwardly inclined camming surfaces as said second camming means is manipulated to engage said second annular member, and said second annular member sliding up said rearwardly inclined camming surfaces and down said forwardly inclined camming surfaces to release said second annular member and permit removal of said case grid means from said case as said second camming means is manipulated to disengage said second annular member.

10. The improvement in accordance with claim 9 including means for indexing said dome grid means to a predetermined position and means for indexing said case grid means to a corresponding position such that said dome grid means and said case grid means are aligned to impart a conventional waffle configuration to said waffles.

* * * * *